United States Patent [19]

Gordy

[11] Patent Number: 5,198,314
[45] Date of Patent: Mar. 30, 1993

[54] SEAL FOR CELLS CONTAINING ALKALINE ELECTROLYTE

[75] Inventor: Dennis J. Gordy, Mason City, Iowa

[73] Assignee: Alexander Manufacturing Company, Mason City, Iowa

[21] Appl. No.: 734,763

[22] Filed: Jul. 23, 1991

Related U.S. Application Data

[62] Division of Ser. No. 293,499, Jan. 4, 1989, Pat. No. 5,057,386.

[51] Int. Cl.[5] .................................................. H01T 2/08
[52] U.S. Cl. ...................................... 429/174; 429/184
[58] Field of Search ..................... 429/82, 174, 184; 29/623.2

[56] References Cited

U.S. PATENT DOCUMENTS 4,333,995  6/1982  Ishida et al. .................... 429/174 X
4,476,200  10/1984 Markin et al. .................... 429/174 X
4,523,376  6/1985  Thibault et al. .................... 429/174

OTHER PUBLICATIONS

Takahashi et al., *Chemical Abstracts*, vol. 107, No. 24232f, Jul. 1987.

Primary Examiner—Stephen Kalafut
Attorney, Agent, or Firm—Hugh D. Jaeger

[57] ABSTRACT

A Polyphenylene Sulfide (PPS) seal for a cell for Alkaline cells, Mercury cells, or NiCad cells. The seal is not susceptible to leakage due to thermal excursions, thermal shocks, or long term storage. The all-polymer seal is of a predetermined geometrical configuration and provides a seal of a material composition for sealability of a cell between the negative or positive terminal cap and the cell can. The PPS seal can also include glass fiber and/or a composition from the olefin family.

10 Claims, 11 Drawing Sheets

SEAL FOR CELLS CONTAINING ALKALINE ELECTROLYTE

CROSS REFERENCES TO CO-RELATED APPLICATIONS

This application is a divisional of U.S. Ser. No. 07/293,499, filed Jan. 4, 1989, now U.S. Pat. No. 5,057,386, entitled "Seal for Cells Containing Alkaline electrolyte" to the same assignee.

BACKGROUND OF THE INVENTION

1. Field of the Invention

The present invention pertains to a seal for a cell, and more particularly, pertains to a Polyphenylene Sulfide (PPS) seal for a cell which is not susceptible to leakage due to thermal excursions, thermal shocks, or long term storage. The present invention also pertains to a cell, and more particularly, pertains to a seal for encapsulating the materials within the cell can.

2. Description of the Prior Art

Prior art cell seals would not provide for a secure, proper, and integral seal about the cell can. This might have subsequently resulted in leakage of the material internal to the cell, such as because of thermal excursions, thermal shocks, or long term storage.

The prior art seals had usually been of nylon materials, and were also susceptible to manufacturing problems and processes not providing for seal integrity. Other types of prior art seals included polyamids or polypropylenes. Some prior art seals included additional coatings (i.e. fatty acids, or asphalt base materials) as seal aids. Other prior art seals included additives for metal to polymer seals.

U.S. Pat. No. 3,922,178, issued on Nov. 25, 1975, to Winger, entitled "Alkaline Battery Seal and Protective Coating Comprising a Fatty Acidamide" where a fatty polyamide is used as a seal or protective coating to prevent alkaline electrolyte from wetting a surface in an alkaline galvanic cell.

U.S. Pat. No. 4,220,694, issued on Sep. 2, 1980, to Vetani et al. entitled "Leak-Proof Alkaline Cell and Its Production" shows a complex gasket and coating film of a triazole compound faced to the gasket.

The present invention overcomes the disadvantages of the prior art by providing a PPS battery seal for cells containing alkaline electrolytes.

SUMMARY OF THE INVENTION

The general purpose of the present invention is to provide a battery seal for cells containing alkaline electrolytes which provides seal integrity, and is not subject to leakage due to thermal excursions, thermal shocks, or long term storage.

According to one embodiment of the present invention, there is provided a cell with a seal which provides seal integrity and is not subject to leakage due to thermal excursions, thermal shocks, or long term storage. The seal is manufactured from Polyphenylene Sulfide (PPS) materials and may include a glass fiber or glass composition and/or a combination from the olefin family. The seal is injection molded. The seal is assembled into the cell by known battery manufacturing processes.

Significant aspects and features of the present invention include a PPS cell seal which, based on its material, provides a mechanical all-polymer seal which precludes leakage. Also, the material composition provides for sealability of the materials inside the cell can.

Other significant aspects and features include a PPS cell seal which provides superior electrical insulating properties and provides superior chemical resistance. The PPS cell seal provides an effective seal against mechanical shock and/or mechanical vibration.

Another significant aspect and feature is a cell seal which prevents leakage at both the anode current collector and the cathode current collector interfaces. The cell seal provides a tight integrity to prevent electrolyte leakage. The cell seal provides sealablity with the metal components of the cell.

Additional significant aspects and features of the present invention include a cell seal of a material which provides a low coefficient of thermal expansion and has good creep resistance to prevent part movement and deflection even at elevated temperatures. The cell seal of this material provides a leak proof seal without the need for additional sealing materials or coatings as required for the prior art seals.

Having thus described embodiments of the present invention, it is a principal object hereof to provide a seal for a cell containing alkaline electrolyte.

Objects of the present invention include a cell seal which provides seal integrity and sealability of the materials inside the cell.

Other objects of the present invention include a PPS cell seal which has long term, high temperature and chemical resistance, and electrical insulation. The seal can be provided with a mechanism hole if this is required, such as for alkaline or nickel cadmium cells.

Further objects of the present invention include a seal which provides electrical isolation between anode and cathode current collectors, and prohibits electrolyte "creepage or leakage".

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
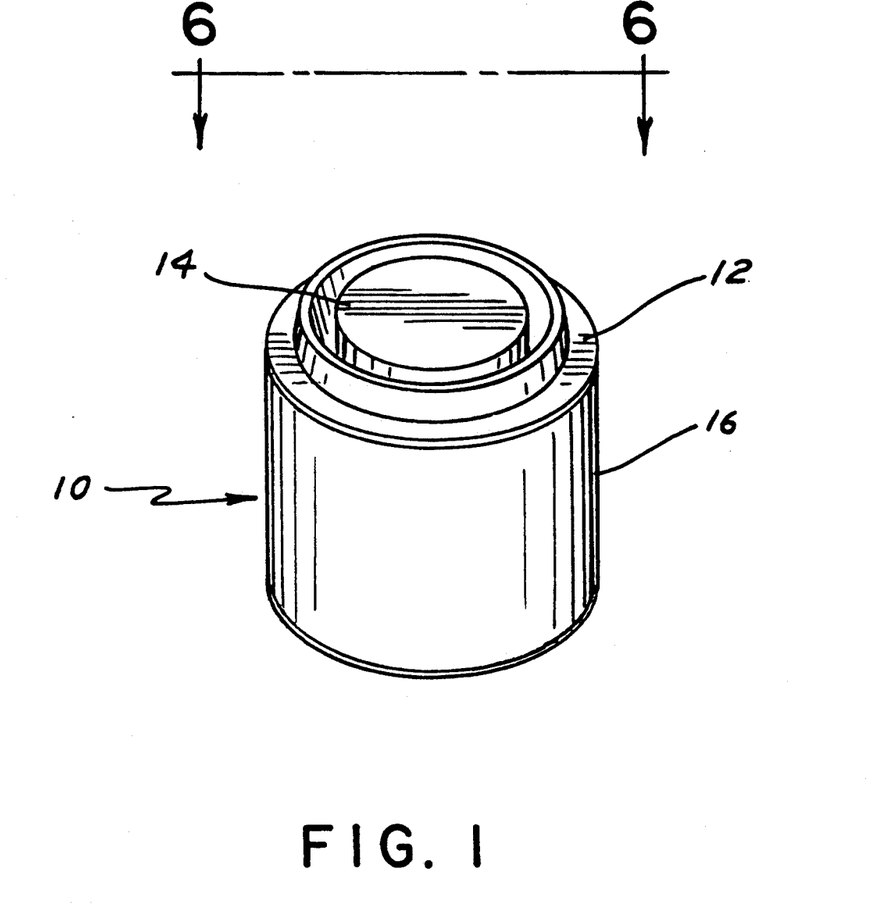
FIG. 1 illustrates a perspective view of a cell with a seal.

FIG. 1 illustrates a perspective view of a cell 10 and a cell seal 12, the present invention, for sealing and leak proofing of the cell 10. The cell seal 12 is interposed between the cell cap 14 and the conductive cell can 16 to effectively contain and seal electrolytes within the cell 10 as now described in detail. The particular cell illustrated in FIGS. 1-7 is a mercury cell.

Figure 2:
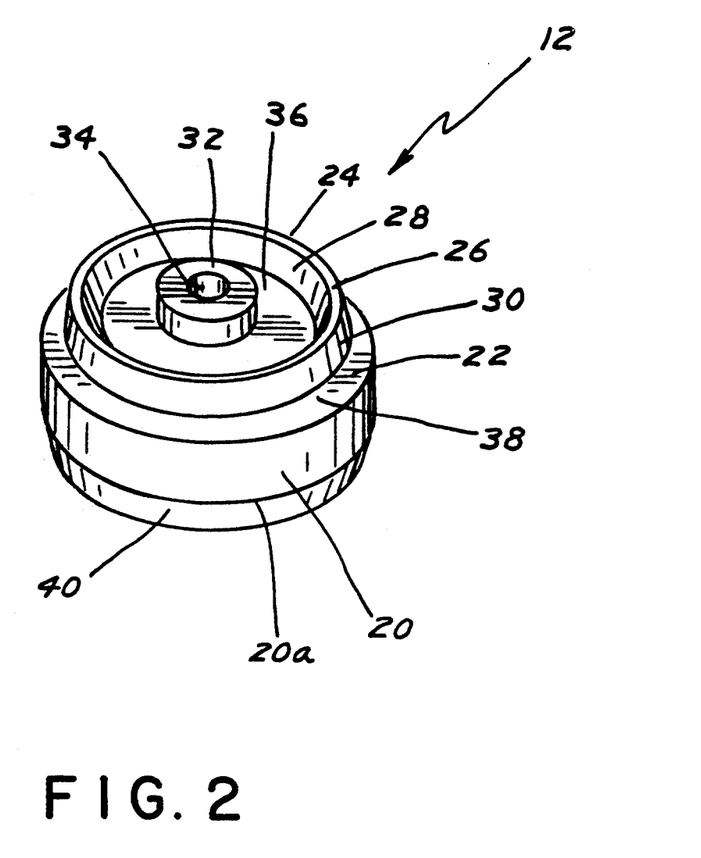
FIG. 2 illustrates a perspective view of the cell seal, the present invention.

FIG. 2 illustrates a perspective view of the cell seal 12, the present invention, where all numerals correspond to those elements previously described. The cell seal 12 is cylindrically shaped and includes a series of integral and configured surface members. A central annular body member 18 with a vertically aligned annular circumferential surface 20 coaxially aligns with the vertical axis of the cell seal 12. A horizontally aligned planar surface 22 intersects the annular circumferential surface 20. An annular ring member 24 extends upwardly from the horizontally aligned planar surface 22, is concentric with the seal axis and includes a top surface 26, an inner sloped wall 28 and an outer sloping wall 30. A cylindrical member 32 including a central hole 34 aligns with the vertical axis of the seal and extends upwardly from the central portion of the horizontally aligned planar surface 22. The cylindrical member 32 and the annular ring member 24 intersect the horizontally aligned planar surface 22 to define an inner annular ring surface 36 and an outer annular ring surface 38. A ramped annular surface 40 extends downwardly and inwardly from and intersects with the lower edge 20a of the annular circumferential surface 20. The cell seal 12 is of polyphenylene sulfide (PPS), such as Ryton sold by Phillips or Fortron sold by Celanese. Other materials, such as alkenes, ethylenes, polypropylene, polyethylene, or other unsaturated compounds with a carbon-carbon double bond $C_nH_{2n}$, can also be utilized as a modifier. The cell seal 12 can include long glass fibers in the amount of 0–40% to provide strength. The fibers can be 0.3 to 0.75 mm long by way of example and for purposes of illustration only and not to be construed as limiting of the present invention. The cell seal can also include an olifinic modifier selected from the group of polypropylene, polyethylene, ethylenes, or like compositions having carbon-carbon double bands. The olifinic modifier provides for tensile elongation and knit line development. The olifinic modifier can be in the amount of 0–50%. Table 1 sets for the composition of the PPS cell seal 12.

TABLE 1

| PPS Cell Seal Composition | |
|---|---|
| Main Composition | Polyphenylene Sulfide (PPS) |
| Optional Compositions | Glass Fiber (0–40%) |
| | Olifinic Modifier (0–50%) |

Figure 3:
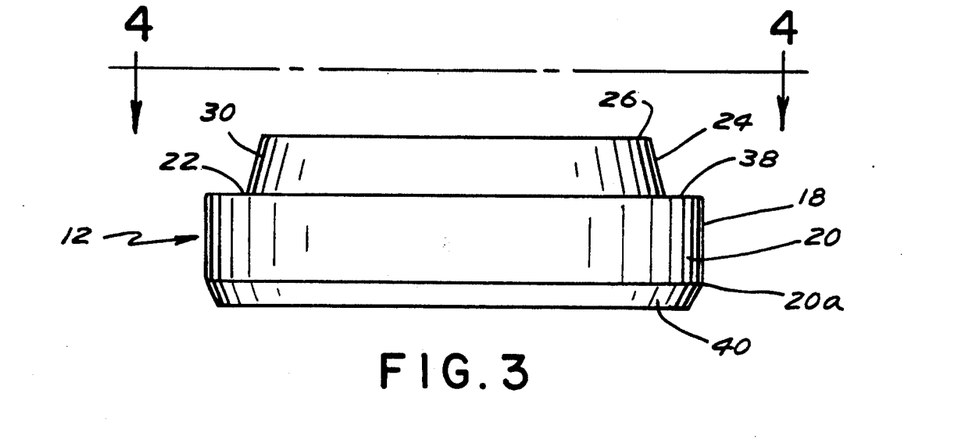
FIG. 3 illustrates a side view of the cell seal.

FIG. 3 illustrates a side view of the cell seal 12 where all numerals correspond to those elements previously described.

Figure 4:
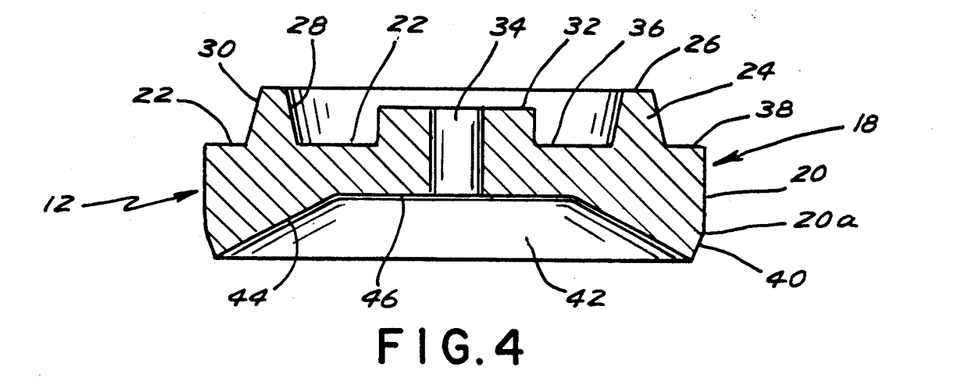
FIG. 4 illustrates a cross-sectional view of a cell seal.

FIG. 4 illustrates a cross-sectional view of the cell seal 12 taken along line 4—4 of FIG. 3. Illustrated in particular is the truncated conical cavity 42 located on the underside of the cell seal 12 formed by a ramped surface 44 and a planar truncated surface 46. The ramped annular surface 40 is guided and accommodated by the inner wall of the cell can 16, along with the lower portion of the annular circumferential surface 20, and is allowed to flex inwardly due to the undercutting afforded by the ramped surface 44 and truncated conical cavity 42 to effect the seal.

Figure 5:
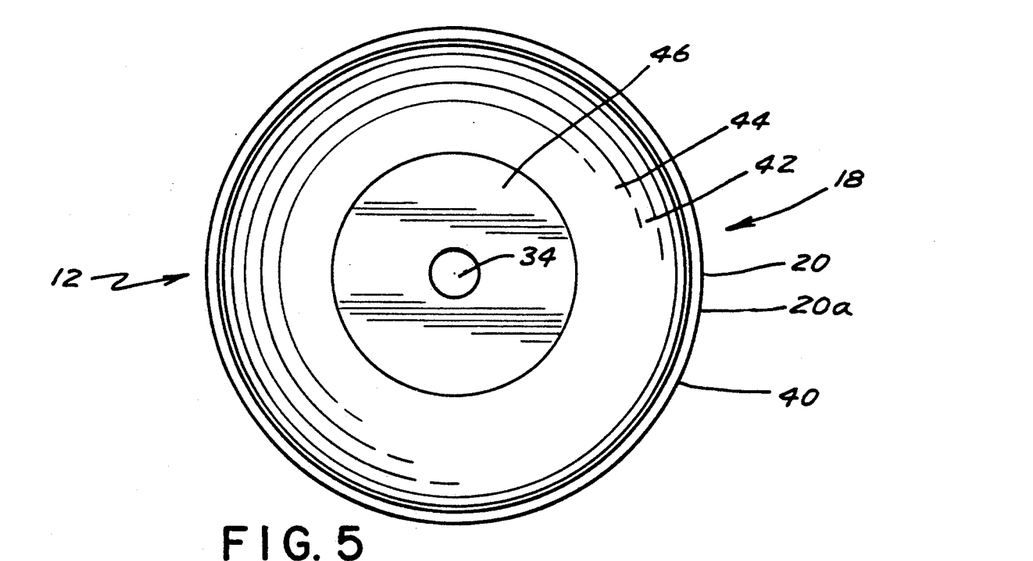
FIG. 5 illustrates a bottom view of the cell seal.

FIG. 5 illustrates a bottom view of the cell seal 12 where all numerals correspond to those elements previously described.

Figure 6:
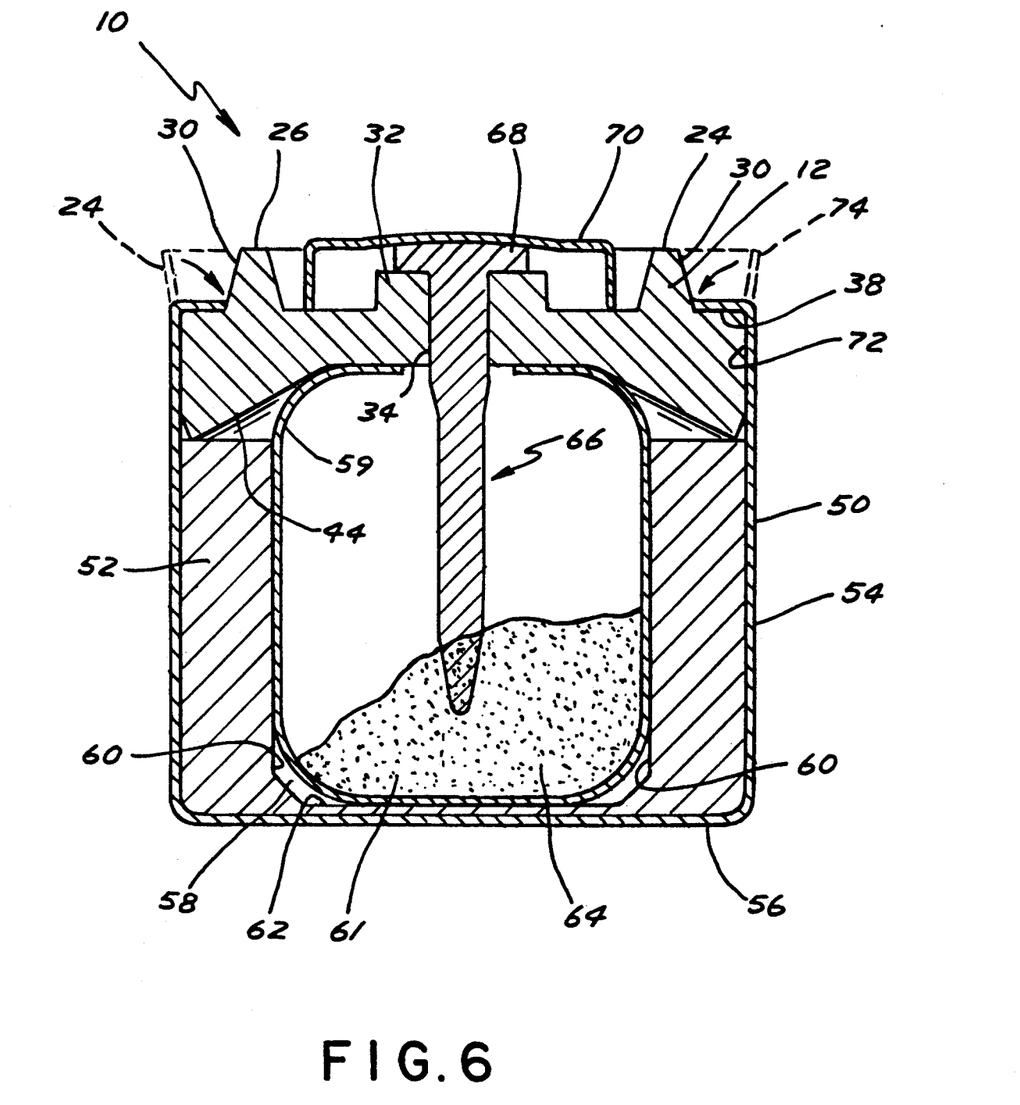
FIG. 6 illustrates a cross-sectional view of the cell seal taken along line 6—6 of FIG. 1.

FIG. 6 illustrates a cross-sectional view of the cell seal 12 taken along line 6—6 of FIG. 1 where all numerals correspond to those elements previously described. The cell 10 is formed by a plurality of components as illustrated and now described. The cell 10 includes a cylindrical cell can 50, an extruded cylindrical cathode 52 engaged about the annular wall 54 and the planar bottom 56 of the cylindrical can 50, an absorber nonreactive separator 59, such as material sold by W. R. Grace & CO., engaging a cavity 58 formed by the inner cylindrical and planar walls 60 and 62 of the extruded cathode 52, anode material 64 contained in an anode cavity 61 as formed by the separator 59, and an anode conductor 66 extending through and frictionally engaging the hole 34 in the cell seal 12 into the anode material 64 in the anode cavity 61. The anode conductor 66 includes an anode conductor head 68 juxtaposing the upper surface of the cylindrical member 32. A conductor cap 70 secures electrically to the anode conductor head 68. The annular circumferential surface 20 and the ramped annular surface 40 of the cell seal 12 frictionally engage and seal against the inner portion 72 of the annular wall 54 of the cell can 50 to prevent flow (creepage and/or leakage) of electrolyte or other corrosive substances to the exterior cell surfaces. The cell can 50 extends above the cell seal 12, shown in dashed lines 74, which is folded over the outer annular ring surface 38 of the cell seal 12 to ensure secure and prolonged physical engagement of the cell seal 12 with the can 50, as well as offering additional sealing beyond that afforded by virtue of the position of the cell seal 12 in engagement with the cell can 50. The ramped and planar surfaces 44 and 46 of the truncated conical cavity 42 engage the upper regions of the separator 59. The plane of top surface 26 of the annular ring member 24 aligns slightly below the plane of the conductor cap 70 to prevent shorting between the upper elements of the cell can 50 and the conductor cap 70 in series stacked batteries as illustrated in FIG. 7.

Figure 7:
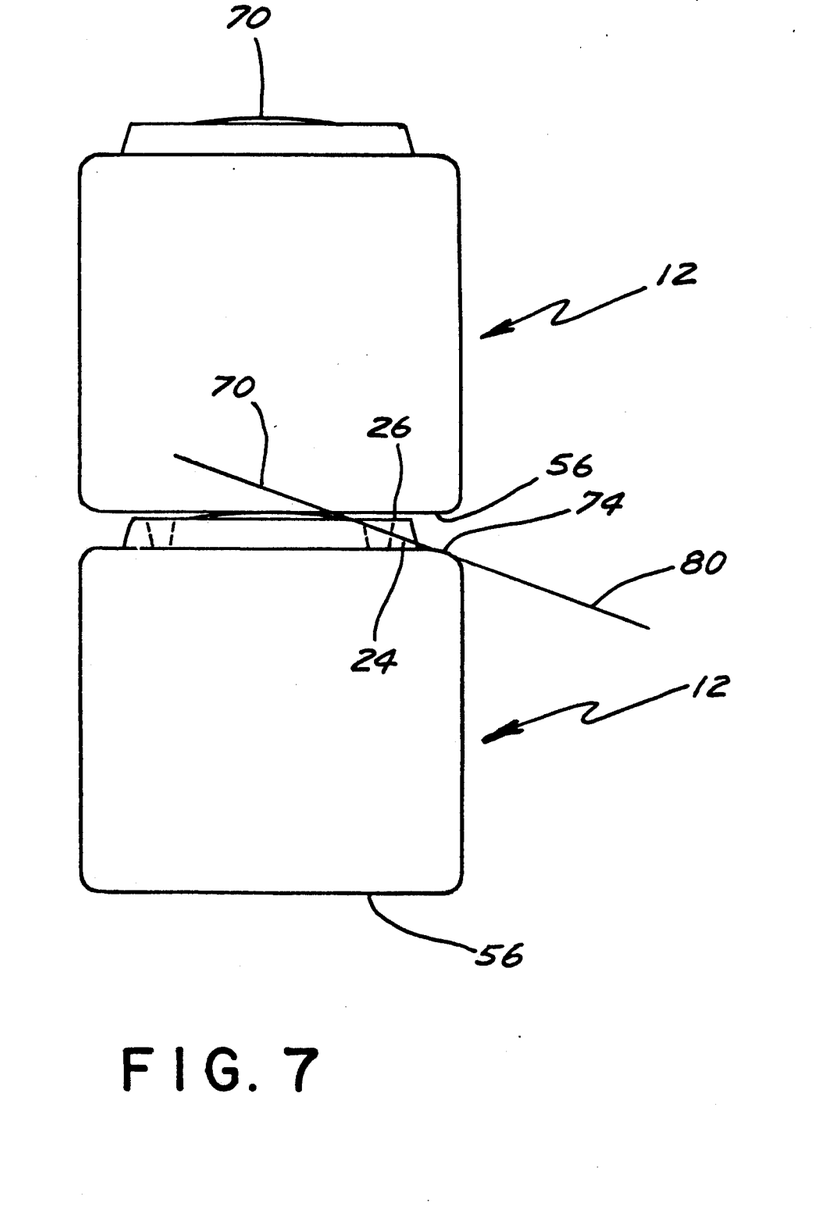
FIG 7 illustrates a pair of stacked cells.

FIG. 7 illustrates a pair of stacked cells 12 in a series configuration. The annular ring member 24 lies above an imaginary line 80 drawn tangent to the conductor cap 70 and folded over annular tab 74 of the cell can 16 to prevent shorting of the underlying cell by an overlying cell planar bottom 56 should the cells become misaligned with respect to each other.

DESCRIPTION OF THE FIRST ALTERNATIVE EMBODIMENT

Figure 8:
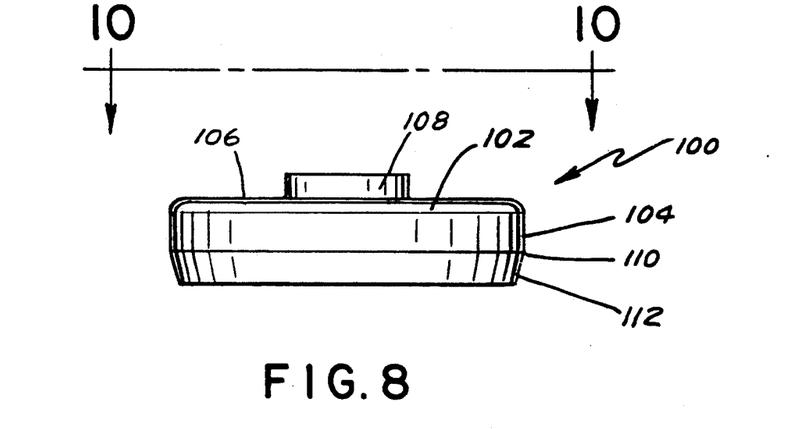
FIG. 8 illustrates a first alternative embodiment, a side view of a cell seal.

FIG. 8, a first alternative embodiment, illustrates a side view of a cell seal 100 for sealing and leak proofing of a cell. The cell seal 100 is cylindrical shaped and includes a series of integral and configured surface members including an central annular body 102 with a vertically aligned annular circumferential surface 104 coaxially aligned with the vertical axis of the cell seal 100, a horizontally aligned planar surface 106 intersecting the annular circumferential surface 104, and a central cylindrical member 108 aligned with the vertical axis extending upwardly from the central portion of the planar surface 106. A narrow horizontally aligned annular ring 110 intersects the annular circumferential surface 104. A ramped annular surface 112 extends downwardly and inwardly from the narrow annular ring 110.

Figure 9:
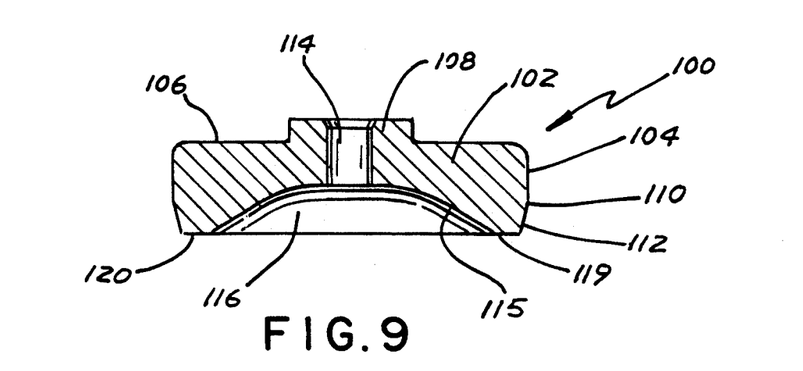
FIG. 9 illustrates a cross-sectional side view taken along line 10—10 of FIG. 9.
Figure 11:
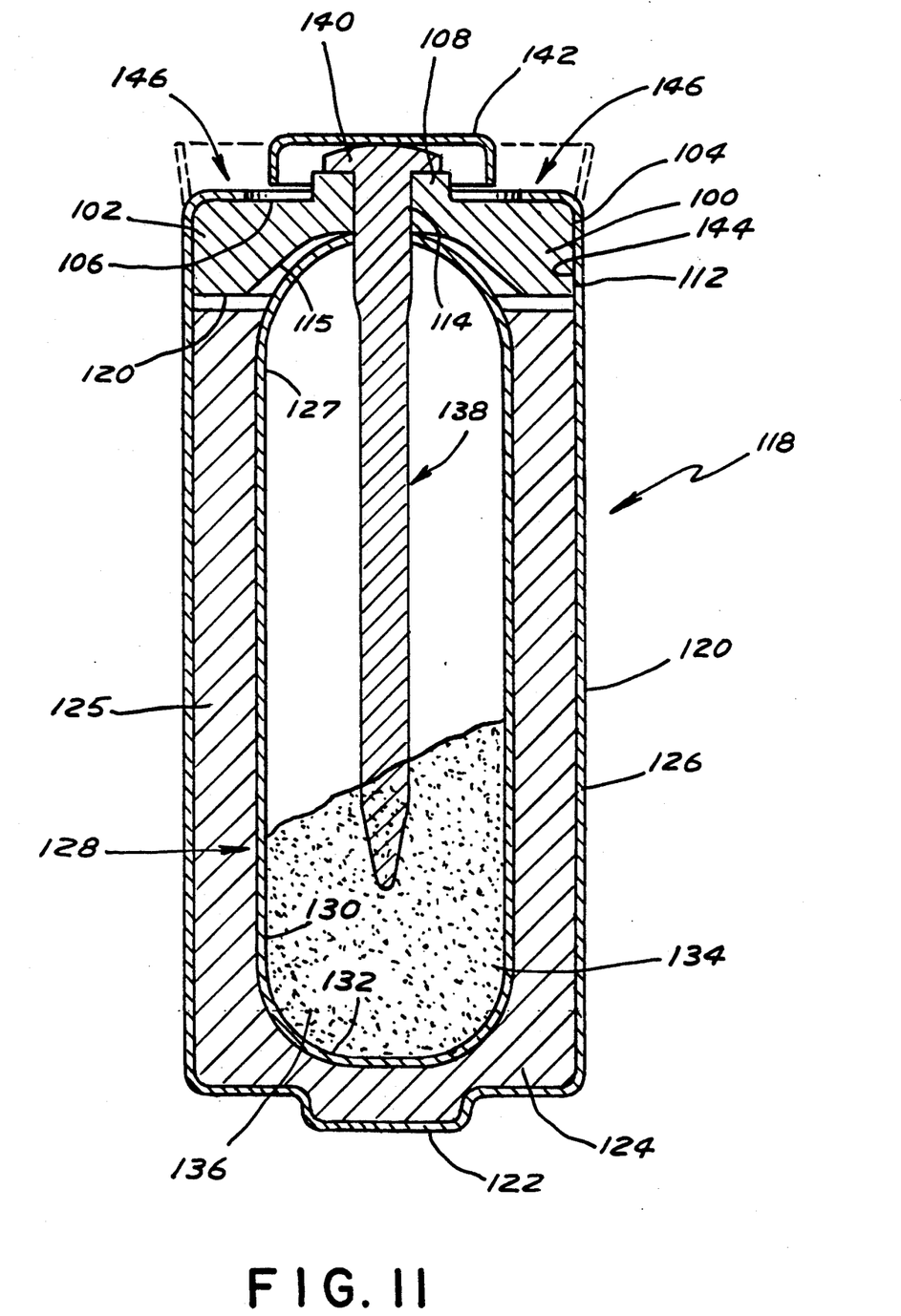
FIG. 11 illustrates a cross-sectional view of a cell.

FIG. 9 illustrates a cross-sectional side view taken along line 10—10 of FIG. 9 where all numerals correspond to those elements previously described. A central hole 114 aligns with the vertical axis of the cell seal 100 and extends through the central annular body 102 and the central cylindrical member 108. A domed cavity 116, as defined by a concave surface 115, is located on the underside of the central annular body 102. The ramped annular surface 112 is guided and accommodated by an inner wall of a cell can, as illustrated in FIG. 11 and is allowed to flex inwardly due to the undercutting afforded by the concave surface 115 of the domed cavity 116 to effect a seal with the cell can 120. A planar surface 119 forms a narrow annular ring 110 as intersected by the concave surface 115 and the ramped annular surface 112.

Figure 10:
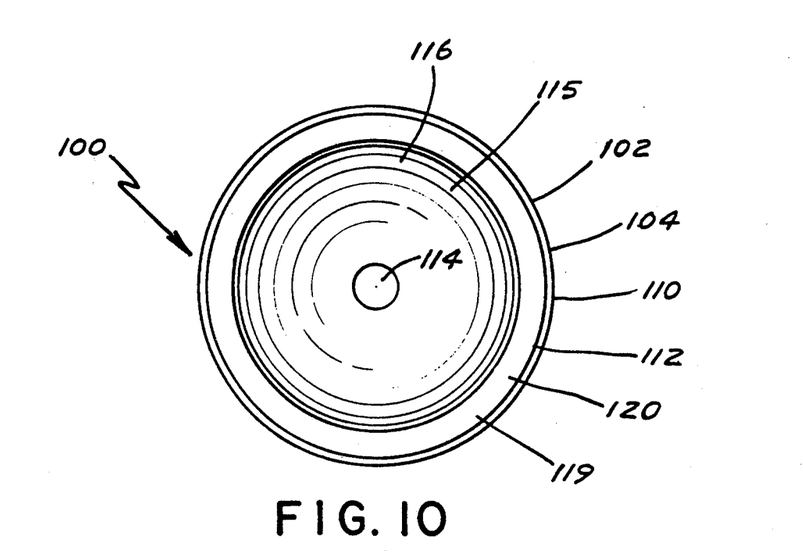
FIG. 10 illustrates a bottom view of the cell seal.

FIG. 10 illustrates a bottom view of the cell seal 100 where all numerals correspond to those elements previously described.

FIG. 11 illustrates a cross-sectional view of a cell 118 where all numerals correspond to those elements previously described. The cell 118 includes a cylindrical cell can 120, a contactor member 122 integral to and protruding from a lower planar surface 124 of the cell can 120, an extruded cylindrical cathode 125 engaged between the annular wall 126 and the lower planar surface 124, and the contactor member 122 of the cell can 120, a separator 127 engaging a cavity 128 as formed by inner cylindrical and rounded bottom walls 130 and 132 of the cylindrical cathode 125 and other elements as described herein. Anode material 134 is contained in an anode cavity 136 formed by the separator 127. An anode conductor 138 extends through and frictionally engages the hole 114 in the cell seal 100 into the anode material 134 in the anode cavity 136. The anode conductor 138 includes a conductor head 140 juxtaposing the upper surface of the central cylindrical member 108. A conductor cap 142 secures electrically to the conductor head 140. The annular circumferential surface 104 and the ramped annular surface 112 of the cell seal 100 frictionally engage and seal against the inner annular wall 144 of the cell can 120 to prevent flow of electrolyte or other corrosive substances to the exterior cell surfaces. The cell 118 also includes a portion of the cell can 120 shown in dashed lines 146 which is folded over the planar surface 106 of the cell seal 100 to ensure secure and prolonged physical engagement of the cell seal 100 with the cell can 120. The concave surface 115 of the cell seal 100 engages the upper regions of the separator 127.

DESCRIPTION OF THE SECOND ALTERNATIVE EMBODIMENT

Figure 12:
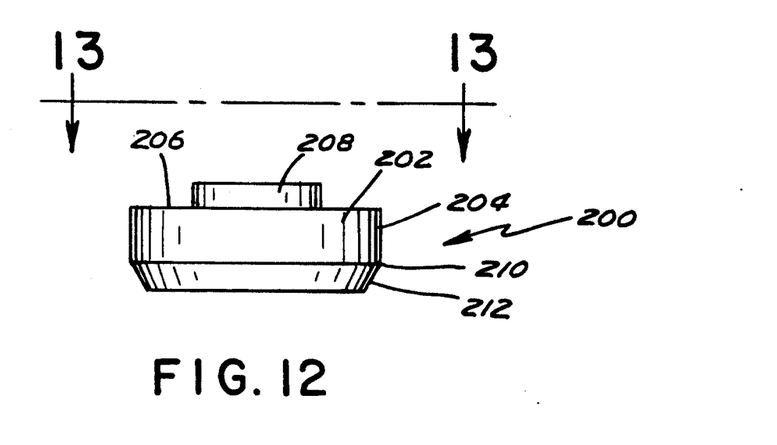
FIG. 12 illustrate a second alternative embodiment, a side view of a cell seal.

FIG. 12, a second alternative embodiment, illustrates a side view of a cell seal 200 for sealing and leak proofing of a cell. The cell seal 200 is cylindrical shaped and includes a series of integral and configured surface members including an annular central body member 202 with a vertically aligned annular circumferential surface 204 coaxially aligned with the vertical axis of the seal 200, a horizontally aligned planar surface 206 intersecting the annular circumferential surface 204, and a central cylindrical member 208 aligned with the vertical axis extending upwardly from the central portion of the planar surface 206. A narrow horizontally aligned annular ring 210 intersects the annular circumferential surface 204. A ramped annular surface 212 extends downwardly and inwardly from the narrow annular ring 210.

Figure 13:
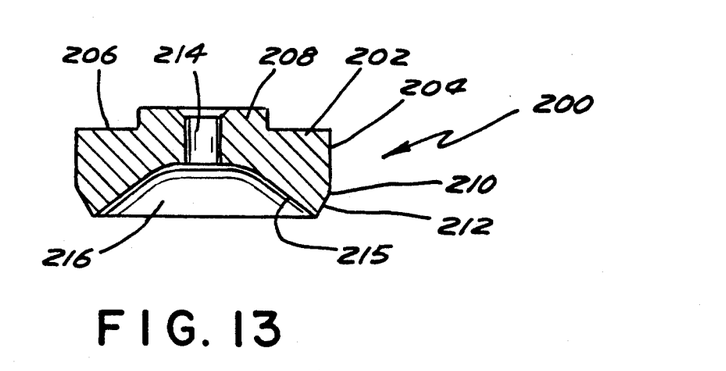
FIG. 13 illustrates a cross-sectional side view taken along line 13—13 of FIG. 12.

FIG. 13 illustrates a cross-sectional side view taken along line 13—13 of FIG. 12 where all numerals correspond to those elements previously described. A central hole 214 aligns with the vertical axis of the cell seal 200 and extend through the central body member 202 and the central cylindrical member 208. A domed cavity 216, as defined by a concave surface 215, is located on the underside of the central annular body 202. The ramped annular surface 212 is guided and accommodated by an inner wall of a cell can 220, as illustrated in FIG. 15 and is allowed to flex inwardly due to the undercutting afforded by the concave surface 215 of the domed cavity 216 to effect a seal with the cell can 220.

Figure 14:
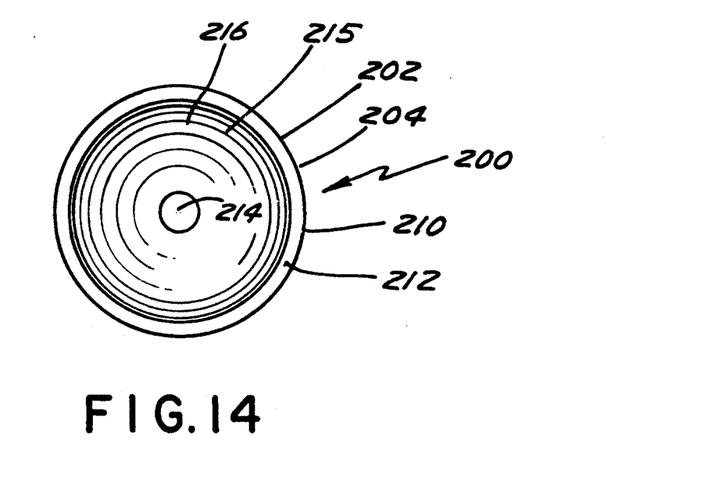
FIG. 14 illustrates a bottom view of the cell seal.

FIG. 14 illustrates a bottom view of the cell seal 200 where all numerals correspond to those elements previously described.

Figure 15:
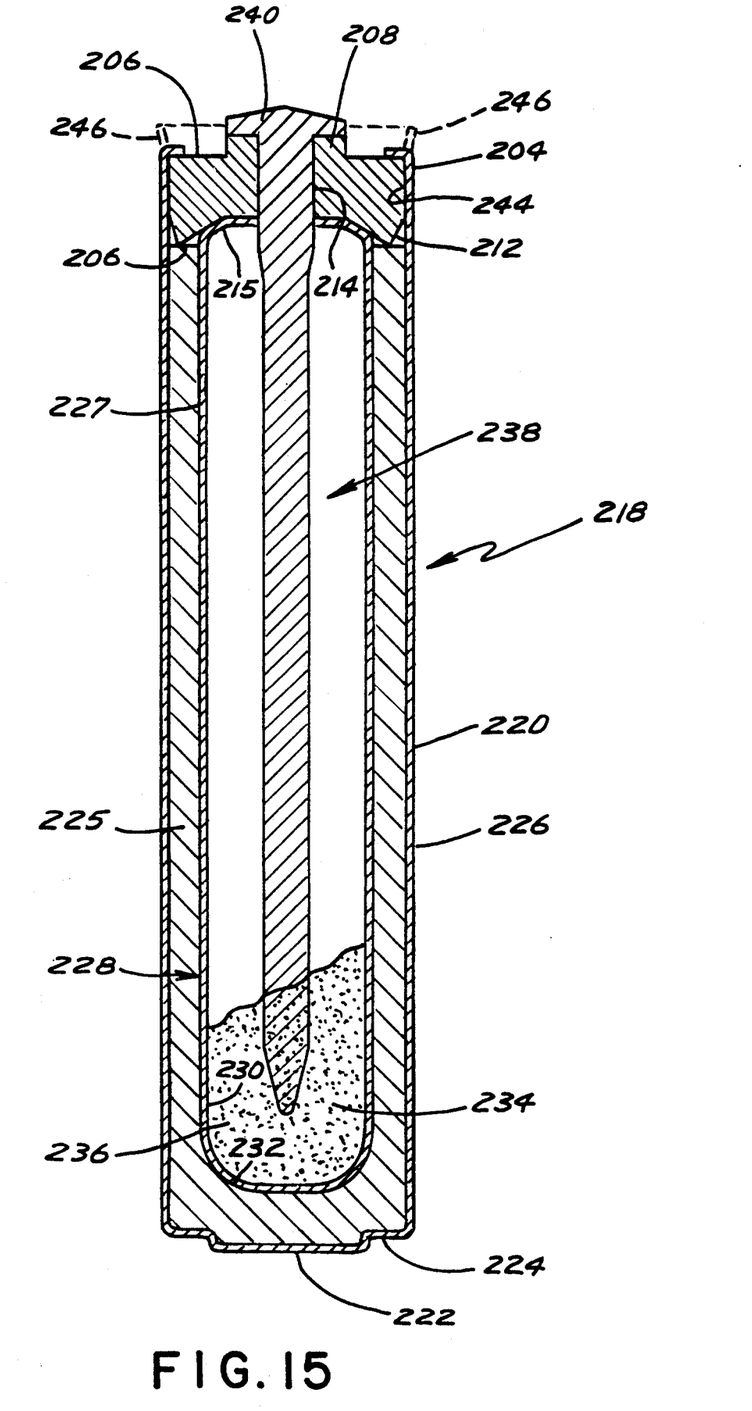
FIG. 15 illustrates a cross section of a cell.

FIG. 15 illustrates a cross section of a cell 218 where all numerals correspond to those elements previously described. The cell 218 includes a cylindrical cell can 220, a contactor member 222 integral to and protruding from a lower planar surface 224 of the cell can 220, an extruded cylindrical cathode 225 engaged between the annular wall 226 and the planar bottom 224, and the contactor member 222 of the cylindrical can 220, a separator 227 engaging a cavity 228 as formed by inner cylindrical and rounded bottom walls 230 and 232 of the extruded cathode 225 and other elements as described herein. Anode material 234 is contained in an anode cavity 236 formed by the separator 227. An anode conductor 238 extends through and frictionally engages the hole 214 in the cell seal 200 into the anode material 234 in the anode cavity 236. The anode conductor 238 includes a conductor head 240 juxtaposing the upper surface of the cylindrical member 208. The annular circumferential surface 204 of the cell seal 200 frictionally engages and seals against the inner annular wall 244 of the cell can 220 to prevent flow of electrolyte or other corrosive substances to the exterior cell surfaces. The cell 218 also includes a portion of the cell can 220 shown in dashed lines 246 which is folded over the annular planar surface 206 of the seal 200 to ensure secure and prolonged physical engagement of the seal 200 with the cell can 220. It is noted that the concave surface 215 of the seal 200 engages the upper regions of the separator 227.

DESCRIPTION OF THE THIRD ALTERNATIVE EMBODIMENT

Figure 16:
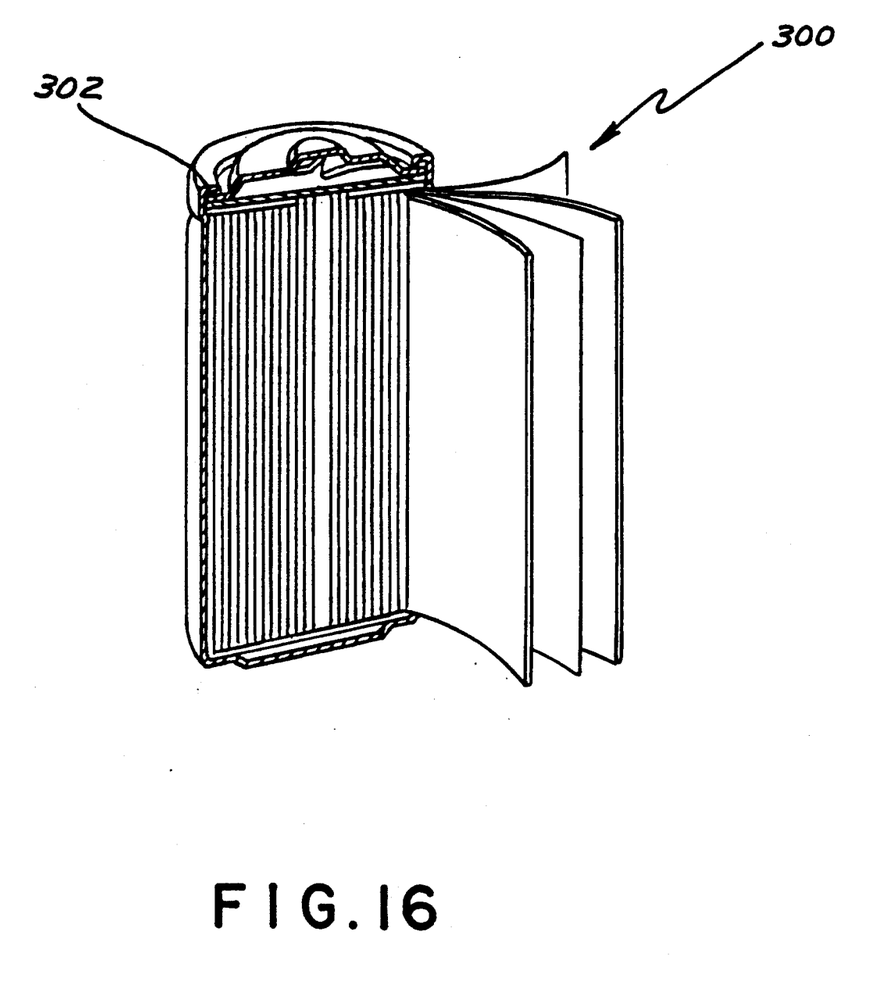
FIG. 16 illustrates a sectional view of a third alternative embodiment of a nickel cadmium button cell; and, FIG. 17 illustrates a sectional view of a fourth alternative embodiment of a nickel cadmium cylindrical cell.

FIG. 16 illustrates a nickel cadmium button cell 300 including a cell seal 302. The cell seal 302 is that as previously described of PPS material and may or may not include glass fibers or an olifinic modifier.

DESCRIPTION OF THE FOURTH ALTERNATIVE EMBODIMENT

Figure 17:
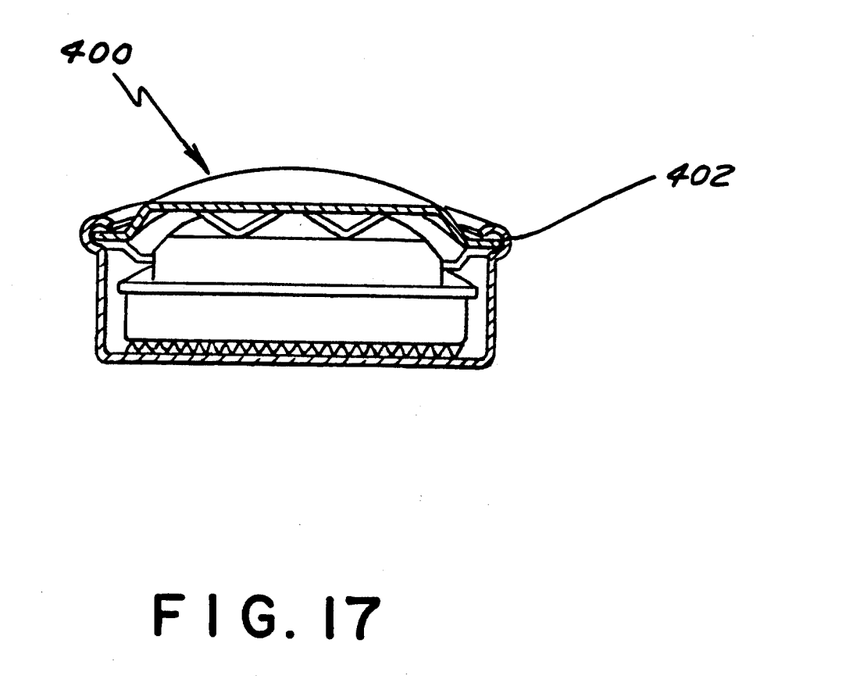

FIG. 17 illustrates a sectional drawing of a nickel cadmium cylindrical cell 400 including a cell seal 402 of PPS material which may or may not include glass fibers and/or an olifinic modifier.

Venting holes or mechanisms can be provided in the seal as so required depending upon the electrolyte in the cell. The cells can be NiCad, mercury, alkaline, or others with the known chemical components and known electrolytes. For a mercury cell, the cathode material would be mercuric oxide, carbon or graphite, with or without manganese dioxide; the separator material; the anode material of almangnated zinc gel or preformed porous zinc; the anode current collector of brass or copper; and a dispersed and absorbed electrolyte of Ka or Na hydroxide. An alkaline cell may be vented and would include a cathode material of carbon or graphite and manganese dioxide. The other chemistry would be similar as described above. The NiCad cell would use known cell construction such as for a cylindrical cell or a button cell. Other types of cells would include nickel-hydrogen, nickel-metal hydride, mercury-cadmium, nickel-zinc, or silver-zinc.

Various modifications can be made to the present invention without departing from the apparent scope hereof.

I claim:

1. A seal for a battery cell comprising:
a cylindrically shaped member formed of polyphenylene sulfide and having a central annular body member with a vertically aligned annular circumferential surface; a horizontally aligned planar surface intersecting said annular circumferential surface; a cylindrical inner member extending upwardly from said horizontally aligned planar surface; and an annular ring member concentrically aligned about said cylindrical inner member and extending upwardly from said horizontally aligned planar surface and including a top surface, an inner sloped wall and an outer sloping wall; said cylindrical inner member and said annular ring member intersecting said horizontally aligned member to define an inner annular ring surface and an outer annular ring surface.

2. The seal of claim 1, wherein said cylindrical inner member comprises an aperture.

3. The seal of claim 1, wherein said cylindrically shaped member further comprises an olefinic modifier.

4. The seal of claim 1, wherein said cylindrically shaped member further comprises glass fibers.

5. A battery cell comprising:
a. a cell can having an annular wall;
b. a cathode engaged about said annular wall so as to form a first cavity;
c. a separator engaging said first cavity formed by said cathode, thereby forming a second cavity;
d. anode material contained in said second cavity;
e. electrolyte in said cell;
f. a cell seal in said cell can, said cell seal being formed of a material comprising polyphenylene sulfide, said cell seal comprising an aperture; and
g. an anode conductor extending through and frictionally engaging said aperture in said cell seal.

6. A battery cell comprising:
a. a cell can having an annular wall;
b. a cathode engaged about said annular wall so as to form a first cavity;
c. a separator engaging said first cavity formed by said cathode, thereby forming a second cavity;
d. anode material contained in said second cavity;
e. electrolyte in said cell;
f. a cell seal in said cell can, said cell seal being formed of a material comprising polyphenylene sulfide, said cell seal comprising a cylindrically shaped member having a central annular body member with a vertically aligned annular circumferential surface; a horizontally aligned planar surface intersecting said annular circumferential surface; a cylindrical inner member extending upwardly from said horizontally aligned planar surface and having an aperture; and an annular ring member concentrically aligned about said cylindrical inner member and extending upwardly from said horizontally aligned planar surface and including a top surface, an inner sloped wall and an outer sloping wall; said cylindrical inner member and said annular ring member intersecting said horizontally aligned member to define an inner annular ring surface and an outer annular ring surface; said annular wall of said cell can being folded over said outer annular ring surface of said cell seal; and
g. an anode conductor extending through and frictionally engaging said aperture in said cell seal.

7. A seal for a battery cell comprising:
a. a sealing member formed of polyphenylene sulfide having a central body member with a vertically aligned circumferential surface for sealing against an inside surface of the battery cell;
b. a horizontally aligned planar surface intersecting said circumferential surface;
c. an inner member extending upwardly from the horizontally aligned planar surface; and,
d. a ring member aligned about the inner member and extending upwardly from the horizontally aligned planar surface for sealing against a top edge of the battery cell.

8. The seal of claim 7 wherein the inner member is cylindrical and includes an aperture.

9. The seal of claim 7 wherein the sealing member further comprises an olefinic modifier.

10. The seal of claim 7 wherein said sealing member further comprises glass fibers.

* * * * *